Nov. 26, 1940.  A. M. DE BELLIS  2,223,300
ELECTRICAL BUS CONSTRUCTION
Filed March 22, 1937   2 Sheets-Sheet 2
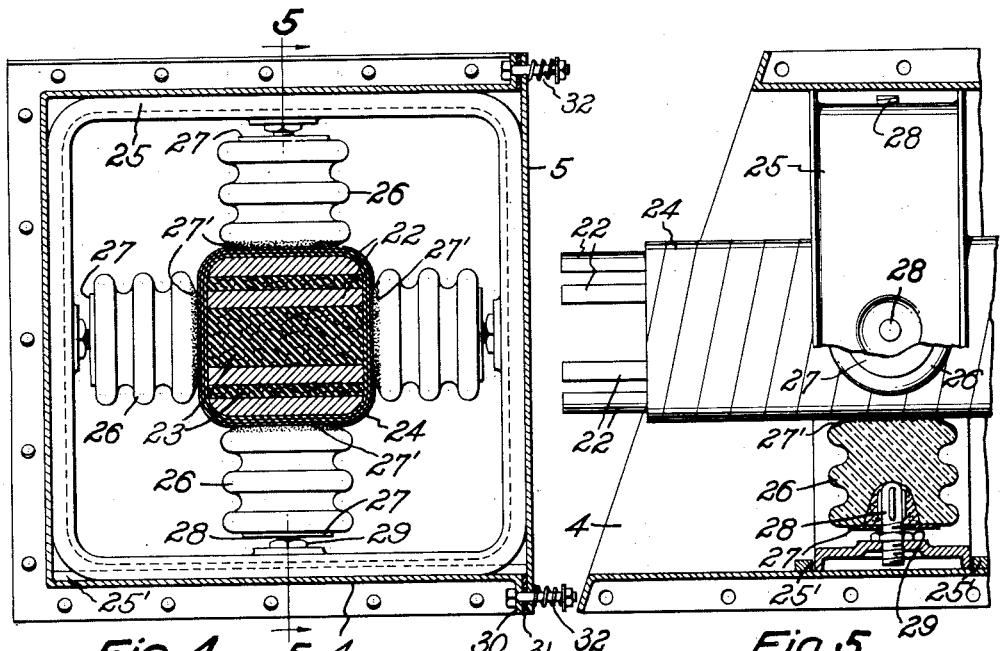
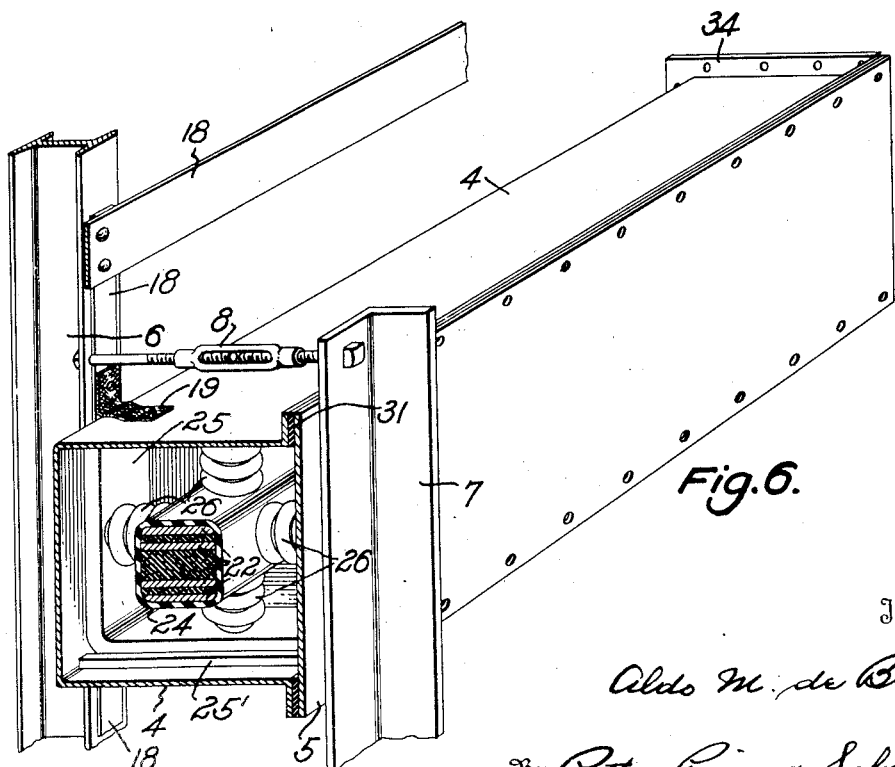
Inventor:
Aldo M. de Bellis,
By Potter, Pierce & Scheffler,
Attorneys.

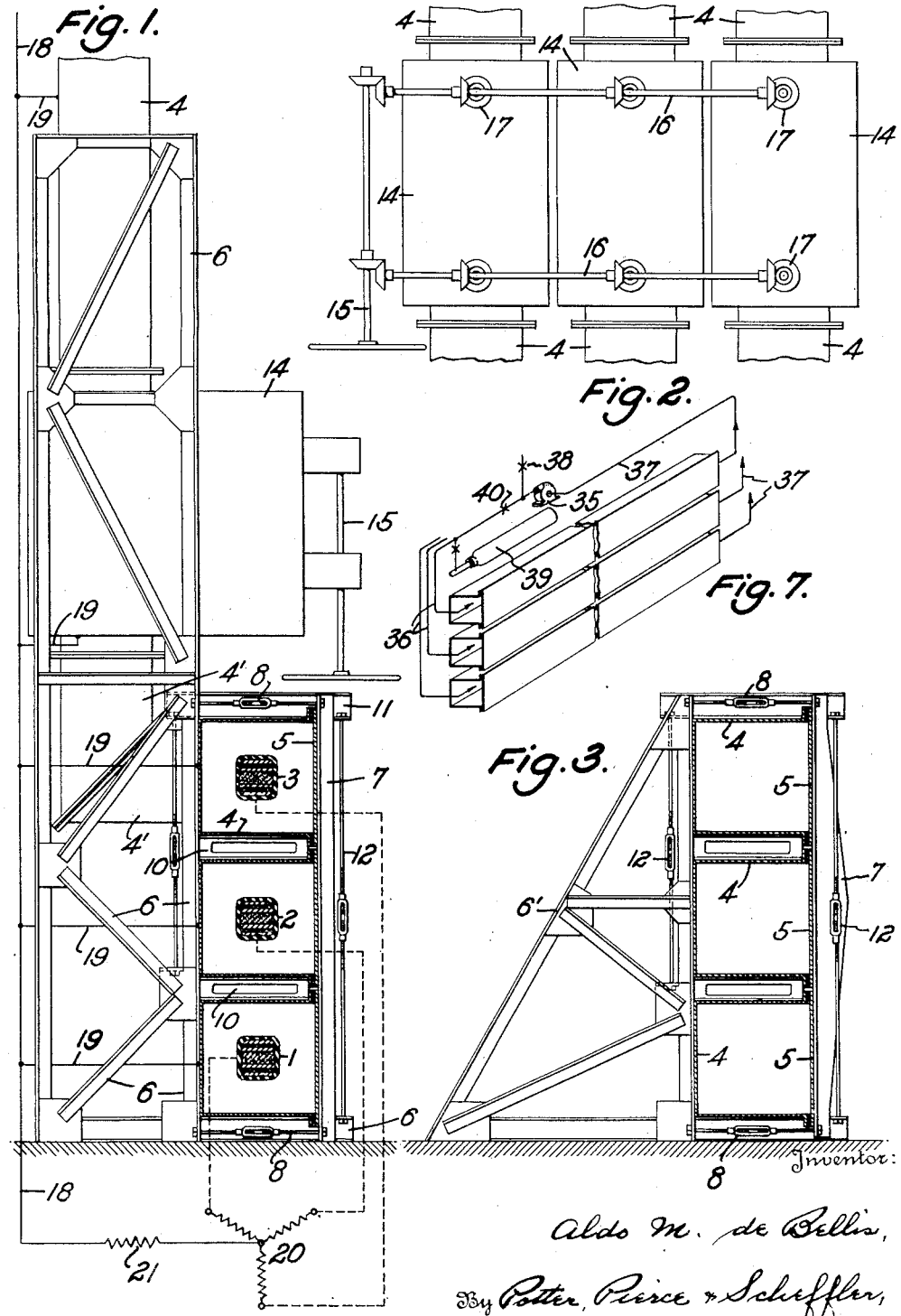

Patented Nov. 26, 1940

2,223,300

UNITED STATES PATENT OFFICE 2,223,300

ELECTRICAL BUS CONSTRUCTION

Aldo M. de Bellis, Summit, N. J., assignor, by mesne assignments, to Railway and Industrial Engineering Company, Greensburg, Pa., a corporation of Delaware Application March 22, 1937, Serial No. 132,431

5 Claims. (Cl. 174—99)

This invention relates to electrical power bus constructions for use in, or as a part of power generating systems, and more particularly to enclosed bus constructions.

With the large amounts of electrical power generated in modern power systems and the resultant concentrations of very great quantities of energy at the station power buses, the consequences of short-circuits in such buses have become disastrous. Various arrangements have been proposed for the construction and protection of such bus systems which carry high currents at high voltages.

According to one system, the bus bars or conductors are housed within metal enclosures that are filled with oil or other insulating material of a liquid or plastic nature. Such constructions are quite expensive and are open to the serious objection that the insulating medium creates a fire hazard in event of leakage or of a defective condition which results in a short circuit. During a short circuit, in such constructions, the gases generated by the dissociation of the insulating medium by the arc, are highly explosive and have caused serious central station fires.

Another system in general use includes a metal cabinet construction in which there are shelves or partitions that divide the enclosure into various compartments for housing the respective bus bars of the various phases. This system, while affording appropriate isolation of the buses under normal operating conditions, is open to the serious objection that a phase to ground short circuit can easily develop into a phase to phase short circuit whenever the short circuit currents are of such a magnitude that they will fuse the separating partitions. Fusing of the separating partitions will admit highly ionized gases to the adjacent compartment, thus creating conditions favorable for a phase to phase short circuit. It may be assumed that such a short circuit is improbable, but phase-to-phase short circuits have occurred with prior compartment constructions of this type. In such constructions, the damages caused by a short circuit are quite extensive, resulting in serious interruptions of service and expensive repairs.

Hence, a method of bus construction which will provide a bus system of greater safety and reliability than is now known to the art, is very desirable.

An object of the present invention is to provide electrical bus constructions, and methods of supporting and protecting bus constructions, that are characterized by a freedom from all possibility of a phase to phase short circuit; each phase or conductor being individually enclosed in a grounded housing or metal box, and the several housing or boxes being separated from each other by a substantial air space. An object is to provide a bus construction, including circuit breakers, switches and the like for the several phases or conductors, in which each phase or conductor, and all elements individual thereto, are separately enclosed within an individual metallic housing that has a low resistance connection of high current-carrying capacity to ground and is separated from other housings of the system by a substantial air space or gap. A further object is to provide a bush construction in which the bus bars or conductors are individually supported in metal troughs or housings by frames and insulators so arranged that the insulators are subjected only to compression stresses and that the stresses are transmitted directly from the insulators to the frames and from the frames to the supporting structures.

Another object is to provide a bus construction in which each phase or conductor is individually enclosed in a grounded housing or metallic box and each housing is filled with a gaseous medium, such as air, a combustion-suppressing gas or a gas of high specific heat; the gaseous medium being circulated through the housing, if desired, to increase the cooling action.

Another object is to provide a bus construction in which each phase or conductor is individually enclosed in a grounded housing or metallic box and each housing is provided with means of relieving any high pressures of the gaseous medium which may be generated inside the housings.

A further object is to provide a bus construction in which the various housings which individually enclose the various phases or conductors are readily assembled and supported individually on mounting structures.

These and other objects and advantages of the invention will be apparent from the following specification when taken with the accompanying drawings in which:

Fig. 1 is a side elevation, with parts in section of a portion of an electrical bus construction embodying the invention, the essential circuit arrangement of a three phase distribution system being shown diagrammatically;

Fig. 2 is a front elevation of a portion of the equipment shown in Fig. 1;

Fig. 3 is a transverse section of another portion of the Fig. 1 equipment;

Fig. 4 is an enlarged transverse section through one bus and its enclosure;

Fig. 5 is a sectional view taken substantially on line 5—5 of Fig. 4;

Fig. 6 is a fragmentary perspective view of the enclosure for one bus and the ground system; and Fig. 7 is a schematic view of an embodiment which includes a blower for circulating a gaseous medium through the bus compartments.

The invention is adapted for use with or as a part of any electrical system for the generation and distribution of power. The electrical system may include buses and operative elements, such as switches, circuit breakers, reactors, metering transformers and the like, that may be located within a building, outdoors, or underground; and the system may supply either direct or alternating current of any number of phases.

The invention will be described with reference to a Y connected three phase alternating current system, and the particular construction that is shown in Figs. 1 and 2 is appropriate for use in a generating station at a point where disconnect switches are arranged between buses on one floor level and extensions or taps which pass to an upper floor level. This particular electrical circuit is not a part of the invention, but the following description of the bus construction at this point in a three phase system will indicate the general method of employing the invention to protect the electrical system.

As shown in Fig. 1, the three phases of a three phase system represented by the three buses 1, 2 and 3, are each housed within an individual bus compartment formed by a rectangular metal trough 4 having a gasketed metal cover 5. The compartments are clamped together and secured to a rigid support that may be the wall and floor of the building or, as shown, a structural steel frame 6.

The compartments are clamped to the rigid support 6 by outer plates 7 and turnbuckles 8; skeleton spacers 10 are arranged between the compartments, and the rigid assembly of the compartments on the support is completed by cross bars 11 that are secured to frame 6 by turnbuckles 12.

The buses pass rearwardly and upwardly, beyond the plane of the section shown in Fig. 1, and the enclosing compartments at the bends in the buses are formed by troughs 4' that have ends cut at 45° to the axis of the troughs. The bus compartments open into the switch compartments 14 that house the disconnect switch and, as shown in Fig. 2, these switch compartments are complete and individual for each phase. The mechanism for actuating the disconnect switches is shown as a manually operated shaft 15 geared to cross-shafts 16 that drive the rotary actuating devices 17 of the separate switch. The rotary type of actuating device facilitates the sealing of the compartments 14 but the details of the switch and its operating mechanism form no part of this invention. Compartments or troughs 4 extend above the switch compartments 14 to an upper floor level where connections are made to branch circuits.

The supporting frame 6', Fig. 3, may be used on each floor level at points where mechanical stresses may arise from short circuit currents. The illustrated design of the steel frame 6' is not an essential part of the invention since the only design requirement is that the bus compartments have adequate support at points where mechanical stresses may arise from short circuit currents. The supporting frames are not required at other points and the assembly of compartments may be clamped to the floor or to short channel or I members that rest on or are secured to the floor.

The bus compartments are individually connected to a ground bus 18 at frequent intervals, preferably at the clamping points, by copper connections 19 of low resistance and high current-carrying capacity, and the ground bus is connected to the neutral of the Y connected generator 20 either directly or through a current limiting element 21 that may be a resistor or any other known type of current limiting device.

It will be noted that the described construction includes a complete, grounded metallic housing for each bus and the devices connected thereto, and that these metallic housings are separated from each other, except at the points of support, by air insulation. The compartments are constructed of non-magnetic metal, such as manganese steel, so as to reduce to a minimum the heating due to induced currents in the compartment walls caused by the magnetic field which surrounds the buses when they carry alternating currents. The thickness of the compartment walls is such that the current-carrying capacity of the compartments is in excess of the short-circuit current that may develop.

This construction provides bus enclosures with adequate capacity to withstand short circuit currents and provides a ground return of adequate capacity between each bus enclosure and the generator neutral. A short circuit between any one phase and ground may occur, but the damage arising from such a short circuit will be confined to the one phase which is short circuited. A phase to phase short circuit cannot arise as the limited current flow to ground is not likely to burn through the compartment walls of a shorted bus and, even if this should occur, the hot ionized gases resulting from that destruction will be dissipated in the ambient air surrounding the damaged enclosure and will not enter the enclosures of the adjacent buses. The ground return of adequate capacity provided for each bus enclosure will guide and facilitate the flow of the short circuit current to the generator neutral, which fact is of importance for the proper operation of protective and control devices, such as relays, or other means known to the art.

Referring now to Figs. 4 to 6 which illustrate the detailed construction of a bus support and a bus enclosure, the bus may be a plurality of copper bars 22 that are formed into a compact rectangular assembly by non-inflammable inserts 23 and a winding 24 of insulating tape.

This particular bus construction is shown for illustrative purposes only and forms no part of this invention. Any other type of bus construction known to the art can also be used.

The bus is supported at the axis of its enclosure by rectangular frames 25 carried by the trough 4 and held in place by guides 25' secured to the trough 4, and sets of substantially cylindrical insulators 26 that extend from the sides of each frame to the bus, the axes of the several substantially cylindrical insulators being normal to the adjacent face of the bus assembly and passing through the center line of the bus. The outer ends of the insulators are provided with flat plates 27 and the inner ends may have coatings 27' of metallic paint, or the metallic paint may be applied as a part of the glazing process. Plates 27 may be held in intimate contact with the outer ends of the insulators by cementing, or the plates may be attached to or form a part of the threaded inserts 28 that are cemented to the insulators. Each insulator carries a threaded insert 28 and to reduce corona discharge, this insert 28 carries a projection in the form of a flat plate which is cemented to, or is brought by other means known to the art, in intimate contact with the lower face of the insulator. The inserts 28 extend through threaded openings in frames 25 for adjustment of the effective length of the insulators, and nuts 29 permit locking the insulators in place after they are adjusted to the proper length.

It will be noted that the insulators bear against the bus and that while the bus is held in place so as to prevent chattering and eliminate hammer blows during short circuits, this type of construction offers a high safety factor due to the fact that the insulators can be used to their best advantage as they are subject only to compression stresses.

Destructive mechanical forces can arise from short circuits in known systems in which the bus supports are mechanically clamped to the buses, such forces being due to mechanical oscillations set up in the bus supports which, being mechanically clamped, are subject to cantilever stresses. These destructive mechanical forces are entirely eliminated by the bus support assemblies of this invention. Another advantage of this type of construction is the great reduction, if not the complete elimination, of corona discharge at the buses due to the absence of metallic clamps surrounding the insulated buses.

Again referring to Figs. 4 to 6, the side walls of the troughs 4 have flanges 30 for receiving gaskets 31 against which the cover plates 5 are yieldingly clamped by bolts and springs 32. Flanges 34 are provided at the ends of the troughs for making tightly bolted gasketed connections between adjacent sections of the trough. The bus compartments and associated compartments housing switches and the like are thus sealed against dust and moisture, but the covers 5 can lift momentarily to vent the compartments in the event of a short circuit and the resultant local increase in pressure due to arcing. An alternative construction for venting would comprise tighted bolted cover plates with ports having spring-held closures arranged at intervals along the plates 5 of the troughs 4.

The gas within the compartments may be air, or combustion-suppressing gases such as nitrogen or carbon dioxide may be introduced into the compartments, to combat fires. The current-carrying capacity of an installation may be increased by circulating the gaseous medium through the ducts to promote the cooling of the bus or, alternatively, a gaseous medium, such as hydrogen, of high specific heat may be introduced into or circulated through the ducts. A system for supplying a gas to and/or circulating the same through the compartments is shown schematically in Fig. 7, and may include a separate blower 35 for forcing air or gas into each of the compartments through a pressure conduit 36 and for withdrawing the gaseous medium from the compartments through a return conduit 37. The pressure conduit has a vent valve 38 for exhausting air from the system when the associated compartment is to be filled with a combustion-suppressing or a heat transfer gas, from a gas tank 39 that is connected to the pressure line. A valve 40 in the pressure line is closed during the initial filling operation, and valve 40 is opened and the vent valve 38 closed when the medium is to be circulated through the compartment. This system may also be used with the compartments normally filled with air and a combustion-suppression gas stored in tanks 39 for displacing the air in the event of a short circuit.

The described constructions eliminate the possibility of the substantial destruction of a portion of a station from a phase to phase short circuit by effecting a substantial isolation of each phase. The gas-filled compartment construction is preferable to the known oil-filled conductors, as the compartments can be readily opened for the inspection, repair or replacement of insulators and sections of the bus.

In this type of construction, the individual compartments, being assembled by means of a clamping arrangement, can readily be installed, and any changes in the electrical connections can readily be made by disconnecting and removing any one section of bus compartment and bus, and inserting the appropriate bus construction. When used for outdoor installations, the invention results in a considerable saving of space as the phases can be located closer together than it is at present possible with the type of open bus construction known to the art.

The original installation of the equipment is quite simple as the single phase bus compartments and buses may be formed in sections and shipped to the plant for assembly. These sections can be formed in such sizes and shapes that the field work consists merely in the assembly of the parts. The sections of bus may be assembled and taped in the shop, with the ends of the conductor plates 22 projecting, as shown in Fig. 5, for connection to the plates of an adjacent bus section.

The trough sections 4 are assembled by bolting the end flanges of adjacent trough sections to each other, and the compartment assembly is clamped to the supporting structure. The supporting frames 25 are then placed in the troughs with the insulators backed away from each other. Taped sections of bus are threaded through the frames and the insulators are adjusted to bear against and support the bus sections. The adjacent ends of the bus members may be connected by welding or bolting short bars or plates between the adjacent ends of the conductor plates of the bus sections. Insulating tape is then wound about the joint to overlap the ends of the windings 24 of the bus sections. The cover plates 5 are then secured to the troughs to complete the assembly. Auxiliary devices such as switches, breakers and the like, are preferably assembled in their compartments at the shop, thus forming complete units that may be bolted to the bus and trough sections in the field. It may also be preferable to have the various sections of single phase bus compartments and buses completely assembled at the factory in which case the field work would consist merely of bolting the sections together and clamping the assembly to the supporting structure.

The invention does not impose any restriction as to the maximum spacing of the several compartments, and the minimum spacing is, in general, that which permits the ready removal and replacement of the covers 5. The separation of the compartments to satisfy this condition will usually provide ample air space between adjacent compartments for cooling the compartment walls in the event of a short between the bus and its enclosure.

It is to be understood that the invention is not restricted to the illustrated embodiments as the design and relative arrangement of the parts may be varied without departure from the spirit of my invention as set forth in the following claims.

I claim:

1. In an electrical installation, the combination with a bus, of means for mechanically supporting and insulating said bus; said means comprising supporting frames for and encircling the bus, a plurality of insulators adjustably mounted on each frame to exert pressure between that frame and the bus, and a metallic housing for individually enclosing the bus, the housing having cover members removable to provide access to substantially the entire length of the bus.

2. In an electrical installation, the combination with a bus, and a winding of insulating material on said bus, of means for mechanically supporting and insulating said bus; said means comprising supporting frames for and encircling the bus, a plurality of insulators adjustably mounted on each frame to exert pressure between that frame and the bus, and a metallic housing for individually enclosing the bus, the housing having cover members removable to provide access to substantially the entire length of the bus.

3. In an electrical system for carrying high currents at high voltage, a bus, and means forming a complete metallic enclosure for said bus; said means including supporting frames spaced along said bus and encircling the same, a series of substantially cylindrical insulators symmetrically spaced about the bus at each frame, the axes of the several insulators passing through the center line of the bus and extending substantially normal to the bus in the plane of the frame, and adjustable means mounting each set of insulators upon the associated frame, whereby said bus may be supported within said frames by stressing said insulators in compression without clamping the insulators to the bus.

4. An electrical system as claimed in claim 3, wherein said frames are integral structures extending around the bus; and said adjustable mounting means comprises threaded inserts secured to the respective insulators and threaded into the associated frame, and a nut on each insert for locking the associated insulator in adjusted position.

5. An electrical installation as claimed in claim 3, wherein said enclosure-forming means includes sectional cover plates extending along and substantially continuously of the enclosure.

ALDO M. DE BELLIS.